US008672191B2

(12) United States Patent
Lee

(10) Patent No.: US 8,672,191 B2
(45) Date of Patent: Mar. 18, 2014

(54) MANUAL SPRAY PUMP

(75) Inventor: Chung Kee Lee, Seoul (KR)

(73) Assignee: Chong Woo Co., Ltd. (KR)

( * ) Notice: Subject to any disclaimer, the term of this patent is extended or adjusted under 35 U.S.C. 154(b) by 272 days.

(21) Appl. No.: 12/812,796

(22) PCT Filed: Jan. 14, 2009

(86) PCT No.: PCT/KR2009/000182
§ 371 (c)(1), (2), (4) Date: Jul. 14, 2010

(87) PCT Pub. No.: WO2009/091173
PCT Pub. Date: Jul. 23, 2009

(65) Prior Publication Data

US 2010/0288856 A1 Nov. 18, 2010

(30) Foreign Application Priority Data

Jan. 14, 2008 (KR) ........................ 10-2008-0003735

(51) Int. Cl.
*G01F 11/00* (2006.01)

(52) U.S. Cl.
USPC .................. 222/321.7; 222/321.8; 222/321.9; 222/383.1; 222/383.3; 222/321.2; 222/340; 222/385; 239/333

(58) Field of Classification Search
USPC ............. 222/321.7–321.9, 340, 383.1, 383.3, 222/385, 321.2; 239/333
See application file for complete search history.

(56) References Cited

U.S. PATENT DOCUMENTS 4,154,374 A * 5/1979 Kirk, Jr. ..................... 222/321.2
(Continued)

FOREIGN PATENT DOCUMENTS

KR 20-0281525 7/2002
KR 20-0282747 7/2002
(Continued)

OTHER PUBLICATIONS

International Search Report—PCT/KR2009/000182 dated Aug. 25, 2009.

*Primary Examiner* — Jason J Boeckmann
*Assistant Examiner* — Joel Zhou
(74) *Attorney, Agent, or Firm* — Cantor Colburn LLP

(57) ABSTRACT

Disclosed herein is a hand-operated spray pump configured to discharge a predetermined amount of content upon pressing a button and to suction a residual portion of the content in an end of a nozzle after discharging the content, the hand-operated spray pump including a housing forming the external appearance of the pump, a housing cap configured to seal the internal space of the housing from the outside, the closure configured to mount a container containing content in the housing, the closure being integrally formed with the housing cap, a stem configured to move upward and downward while being connected to the lower end of the button, the shaft configured to move upward and downward along the inside of the housing cap while being coupled to the outside of the stem, a piston configured to move upward and downward along the inner wall of the housing, a compression spring provided between a side protrusion formed at the upper end of the shaft at the side of the shaft and the housing cap, an opening and closing member configured to move upward into and downward from the vertical channel through the lower end of the stem such that the residual content in the nozzle is suctioned after pumping, and a sealing member mounted at the lower end of the stem in a state in which the sealing member is in tight contact with the outside of the opening and closing member inserted into the vertical channel.

6 Claims, 9 Drawing Sheets

(56) References Cited

U.S. PATENT DOCUMENTS

| | | | | | |
|---|---|---|---|---|---|
| 4,821,928 | A * | 4/1989 | Su | .............................. | 222/321.2 |
| 6,016,964 | A * | 1/2000 | Ohkubo | .......................... | 236/13 |
| 6,047,856 | A * | 4/2000 | Meshberg et al. | ................ | 222/1 |
| 7,938,298 | B2 * | 5/2011 | Lee | ............................ | 222/321.1 |

FOREIGN PATENT DOCUMENTS

| | | | | |
|---|---|---|---|---|
| KR | 200281525 | * 7/2002 | ............. | A45D 34/00 |
| KR | 10-2005-0104754 | 11/2005 | | |
| KR | 1020040030152 | * 11/2005 | | |
| KR | 20-0435901 | 3/2007 | | |

* cited by examiner

100

200

MANUAL SPRAY PUMP

TECHNICAL FIELD

The present invention relates to a hand-operated spray pump configured to discharge a predetermined amount of content upon pressing a button, and, more particularly, to a hand-operated spray pump including a housing forming the external appearance of the pump, a housing cap configured to seal the internal space of the housing from the outside, the closure configured to mount a container containing content in the housing, the closure being integrally formed with the housing cap, a stem configured to move upward and downward while being connected to the lower end of the button, the shaft configured to move upward and downward along the inside of the housing cap while being coupled to the outside of the stem, a piston configured to move upward and downward along the inner wall of the housing, a compression spring provided between a side protrusion formed at the upper end of the shaft at the side of the shaft and the housing cap, an opening and closing member configured to move upward into and downward from the vertical channel through the lower end of the stem such that the residual content in the nozzle is suctioned after pumping, and a sealing member mounted at the lower end of the stem in a state in which the sealing member is in tight contact with the outside of the opening and closing member inserted into the vertical channel.

BACKGROUND ART

A hand-operated pump has been normally used in bath goods or cosmetics containers that discharge a predetermined amount of liquid, emulsion, or oil content each time because of its convenience. Especially, the hand-operated pump has been widely used because of its characteristics that a predetermined amount of content can be easily discharged each time by the hand-operated pump while the content is stored in the container, and technology related to the hand-operated pump has been continuously developed.

A conventional hand-operated spray pump mainly includes a housing forming the external appearance of the pump, a closure used to mount the housing to a container, a stem communicating with a discharge port formed at a button and configured to be moved upward and downward along the housing, a shaft configured to guide the upward and downward movement of the stem and to connect the stem to the button, a housing cap configured to guide upward and downward movement of the shaft and to seal the internal space of the housing from the outside, a piston mounted to the stem such that the piston can be moved upward and downward along the inner wall of the housing, a compression spring mounted to the inner lower part of the housing, and a ball configured to open and close an inlet port formed at the lower end of the housing.

However, the conventional hand-operated spray pump has several problems as follows:

First, the compression spring is located on the route along which the content flows, with the result that the compression spring comes into contact with the content. Consequently, it is difficult for the content to flow due to the compression spring. That is, flow resistance to the content is increased by the compression spring. Also, the compression spring may be deteriorated. In this case, the content may also be deteriorated.

Second, a residual portion of the content is present at the discharge port of the button after pumping the content, which is not preferable in view of sanitation. Also, if such content exhibits low viscosity, the content may fall or be solidified, thus clogging the discharge port of the button.

Third, sealability with respect to the content in the container is increasingly reduced due to repetitive pumping. Especially when a pump containing oil for cleansing cosmetics and beauty products is used, the content does not leak at first due to spreadability of the oil; however, leakage of the content occurs with the passage of time.

Various structures have been developed to solve the above problems; however, there is no hand-operated spray pump providing satisfactory results yet. For this reason, there is high necessity for technology that is capable of fundamentally solving the above problems.

DISCLOSURE

Technical Problem

Therefore, the present invention has been made to solve the above problems, and other technical problems that have yet to be resolved.

Specifically, it is an object of the present invention to provide a hand-operated spray pump configured such that high sealing force is provided to prevent leakage of content, residual content is not present in a discharge port of the pump but is introduced into the pump after pumping, the assembly of the pump is easy and simple, there is a low possibility of pump breakdown, and the content in the pump is not deteriorated.

Technical Solution

In accordance with an aspect of the present invention, the above and other objects can be accomplished by the provision of a hand-operated spray pump configured to discharge a predetermined amount of content upon pressing a button and to suction a residual portion of the content in an end of a nozzle after discharging the content, the hand-operated spray pump including (a) a housing forming the external appearance of the pump, (b) a housing cap configured to guide upward and downward movement of a shaft, to connect the housing to a closure, and to seal the internal space of the housing from the outside, (c) the closure coupled to the upper part of the housing at the outside of the housing via the housing cap for mounting a container containing content in the housing, the closure being integrally formed with the housing cap, (d) a stem having a horizontal channel communicating with the internal space of the housing and a vertical channel communicating with the horizontal channel, the stem being configured to move upward and downward while being connected to a lower end of the button, (e) the shaft configured to move upward and downward along the inside of the housing cap while being coupled to the outside of the stem, (f) a piston configured to move upward and downward along the inner wall of the housing for opening and closing the horizontal channel of the stem while being mounted to the lower part of the stem, (g) a compression spring provided between a side protrusion formed at the upper end of the shaft at the side of the shaft and the housing cap for providing restoring force to the shaft during pumping, (h) an opening and closing member located at the lower part of the housing in the internal space of the housing for opening and closing an inlet port formed at the lower end of the housing during pumping, the opening and closing member being configured to move upward into and downward from the vertical channel through the lower end of the stem such that the residual content in the nozzle is suctioned after pumping, and (i) a sealing member mounted at the lower end of the stem in a state in which the sealing member is in tight contact with the outside of the opening and closing member inserted into the vertical channel for increasing force necessary to suction and seal the residual content.

In the hand-operated spray pump having the above-described structure according to the present invention, when the button is pressed to pump content (hereinafter, referred to as a pressurized mode), the compression spring located between the side protrusion of the shaft and the housing cap is compressed, with the result that the content in the internal space of the housing is discharged through the discharge port of the button via the vertical channel of the stem. On the other hand, when the force applied to the button is released (hereinafter, referred to as a relaxed mode), restoring force of the compression spring is transmitted to the shaft, with the result that the content in the container is introduced into the internal space of the housing.

Since the compression spring, which provides restoring force necessary to perform the pumping operation, is not located on the route along which the content flows, therefore, flow resistance to the content is reduced, and there is low possibility of the content being contaminated due to the compression spring, as previously described.

Also, the residual content in the nozzle is suctioned into the stem after pumping by the sealing member mounted at the lower end of the stem and the opening and closing member moving upward into and downward from the vertical channel through the lower end of the stem. Consequently, it is possible to effectively prevent the hand-operated spray pump from being contaminated due to the residual content in the end of the nozzle of the button. In addition, if the content is low-viscosity oil, it is possible to effectively prevent the residual content from falling from the inlet of the nozzle or being solidified with the passage of time, and therefore, it is possible to effectively prevent the inlet of the nozzle from being clogged.

Furthermore, the sealing member functions to improve sealability between the vertical channel of the stem and the container, and therefore, it is possible to prevent the content from leaking from the interface between the opening and closing member and the lower end of the stem.

In a preferred example, the opening and closing member may include an upper end vertical extension configured to be inserted into the vertical channel of the stem, the opening and closing member may be provided at the side of the lower part thereof located at the inlet port formed at the lower end of the housing with radial protrusions extending outward, and the upper end vertical extension may be configured to move along a hollow inside of the sealing member while the upper end vertical extension is in tight contact with the hollow inside of the sealing member.

That is, in the pressurized mode, a portion of the upper end vertical extension of the opening and closing member is inserted into the vertical channel of the stem to pressurize the content in the container, with the result that the content in the stem is smoothly discharged through the nozzle. On the other hand, in the relaxed mode, the stem, which has been moved in the lower direction of the housing, is raised to the original position thereof by the restoring force of the compression spring, with the result that the portion of the upper end vertical extension of the opening and closing member inserted into the stem is moved out of the stem. At this time, the internal pressure of the stem is lowered in proportion to the space occupied by the upper end vertical extension moved out of the stem, with the result that the residual content in the inlet of the nozzle is suctioned into the stem by pressure difference between the stem and the outside, and therefore, the residual content is removed from the inlet of the nozzle after pumping.

In a preferred example of the above structure, the opening and closing member may be configured to have a hollow structure open at the lower end thereof, and a projection part may be formed at the inside of the inlet port formed at the lower end of the housing for restricting upward movement of the opening and closing member. In this structure, the upward and downward movement of the radial protrusions is restricted by the projection part.

That is, since the opening and closing member is configured to have a hollow structure open at the lower end thereof, the opening and closing member elastically comes into tight contact with the inlet port formed at the lower end of the housing by the internal pressure of the housing increased in the pressurized mode, thereby further improving sealability.

In another example, the opening and closing member may be provided at the lower end thereof with a depression, and the depression may be coupled to a suction ball to improve sealability with respect to the inlet port formed at the lower end of the housing.

During pumping, the suction ball is moved upward and downward along with the opening and closing member to further improve sealability with respect to the inlet port formed at the lower end of the housing by gravity.

Meanwhile, the sealing member may include a suction cover configured to have a hollow structure. The suction cover may have an outer circumference configured in a shape corresponding to the inner circumference of the stem at the lower end of the stem, and an inner protrusion may be formed at the inner circumference of the suction cover at the lower end of the suction cover for improving tight contact between the outer circumference of the opening and closing member at the upper end of the opening and closing member and the inner circumference of the suction cover at the lower end of the suction cover.

That is, the outer circumference of the suction cover is configured in a shape corresponding to the inner circumference of the stem at the lower end of the stem, with the result that the coupling between the suction cover and the stem is easily achieved. In the structure in which the suction cover and the stem are coupled, the suction cover may be moved upward and downward along with the stem during pumping.

Also, the inner protrusion formed at the inner circumference of the suction cover at the lower end of the suction cover may improve tight contact between the outer circumference of the opening and closing member at the upper end of the opening and closing member (for example, the outer circumference of the upper end vertical extension of the opening and closing member) and the inner circumference of the suction cover at the lower end of the suction cover.

The material for the suction cover is not particularly restricted as long as the material does not react with the content in the pump and exhibits high sealability. For example, the suction cover may be made of linear low-density polyethylene (LLDPE). When the above material is used, friction at the interface between the suction cover and the opening and closing member is reduced, with the result that wear at the contact regions between the suction cover and the opening and closing member is minimized, which is preferable.

According to circumstances, the sealing member may include a suction cover configured to have a hollow structure and a suction ring mounted at a top of the suction cover, and the suction cover may have an outer diameter greater than the outer diameter of the suction ring.

That is, the sealing member is configured in a double sealed type structure achieved by the suction cover and the suction ring, thereby further improving sealability. Also, the outer diameter of the suction cover is greater than the outer diameter of the suction ring, and the inner circumference of the stem at the lower part of the stem is configured to have a multi-step structure corresponding to the suction cover and the suction ring, thereby easily achieving the coupling of the suction cover and the suction ring to the inner circumference of the stem at the lower part of the stem.

In the above structure, the materials for the suction cover and the suction ring are not particularly restricted as long as the material improves sealability with respect to the opening and closing member. For example, the suction cover may be made of high-density polyethylene (HDPE), which is inexpensive and exhibits high chemical resistance, and the suction ring may be made of silicone or rubber, which exhibits high sealability, high flexibility, and high chemical resistance.

Especially when the suction ring is made of such material having high flexibility and sealability as described above is used, friction at the interface between the suction ring and the opening and closing member is reduced, and sealability at the interface between suction ring and the opening and closing member is greatly improved.

Furthermore, in the double sealed type structure in which the sealing member includes the suction cover and the suction ring, sealability between the sealing member and the opening and closing member is further improved, for example, in a case in which the content contained in the pump is oil, since the suction ring exhibits higher sealability than injection-molded plastic. When oil is used as material for cleansing cosmetics and beauty products, the oil does not leak at first due to spreadability of the oil; however, leakage of the oil may occur with the passage of time. The above problem may be solved by the double sealed type structure achieved by the suction cover and the suction ring as described above.

The material for the opening and closing member is not particularly restricted as long as the material does not react with the content in the pump. For example, the opening and closing member may be preferably made of linear low-density polyethylene (LLDPE), which exhibits high flexibility.

When such material exhibiting high flexibility is used as described above, sealability between the sealing member and the opening and closing member is improved, while friction at the interface between the sealing member and the opening and closing member is reduced as previously described, which is preferable.

Meanwhile, the material for the stem is not particularly restricted as long as the material exhibits high fatigue resistance, high rigidity, and high abrasion resistance. For example, the stem may be made of polyoxymethylene (POM).

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
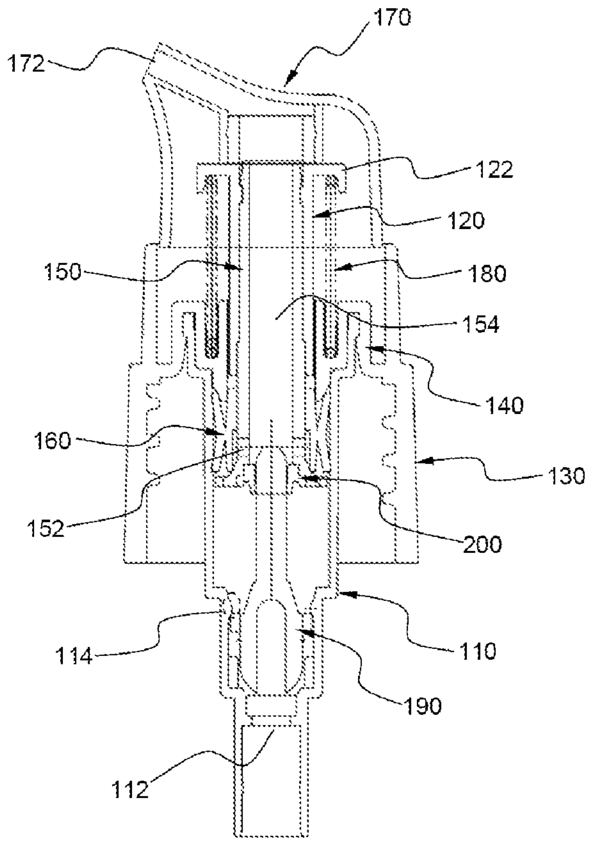
FIG. 1 is a vertical sectional view illustrating a hand-operated spray pump according to an embodiment of the present invention.

FIG. 1 is a vertical sectional view typically illustrating a hand-operated spray pump according to an embodiment of the present invention.

Referring to FIG. 1, a hand-operated spray pump 100 includes a housing 110 forming the external appearance of the pump, the housing 100 being configured in a multi-step shape, the diameter of which is reduced downward, a button 170 having a nozzle 172 formed therein, a housing cap 140 configured to guide upward and downward movement of a shaft 120, to connect the housing to a closure 130, and to seal the internal space of the housing 110 from the outside, the closure 130 coupled to the upper part of the housing 110 at the outside of the housing 110 via the housing cap 140 for mounting a container (not shown) containing content in the housing 110, the closure 130 being integrally formed with the housing cap 140, a stem 150 having a horizontal channel 152 communicating with the internal space of the housing 110 and a vertical channel 154 communicating with the horizontal channel 152, the stem 150 being configured to move upward and downward while being connected to the lower end of the button 170, and the shaft 120 configured to move upward and downward along the inside of the housing cap 140 while being coupled to the outside of the stem 150.

A piston 160 configured to move upward and downward along the inner wall of the housing for opening and closing the horizontal channel 152 is located in the lower part of the stem 150. A compression spring 180 configured to provide restoring force to the shaft 120 during pumping is mounted between a side protrusion 122 formed at the upper end of the shaft 120 at the side of the shaft 120 and the housing cap 140.

Also, an opening and closing member 190 configured to open and close an inlet port 112 formed at the lower end of the housing 110 during pumping is located at the lower part of the housing 110 in the internal space of the housing 110. The opening and closing member 190 moves upward into and downward from the vertical channel 154 through the lower end of the stem 150 such that residual content in the nozzle 172 is suctioned after pumping.

Meanwhile, a sealing member 200 mounted at the lower end of the stem 150 is configured to have a structure in which the sealing member 200 is in tight contact with the outside of the opening and closing member 190 inserted into the vertical channel 154 for increasing force necessary to suction and seal residual content.

Figure 2:
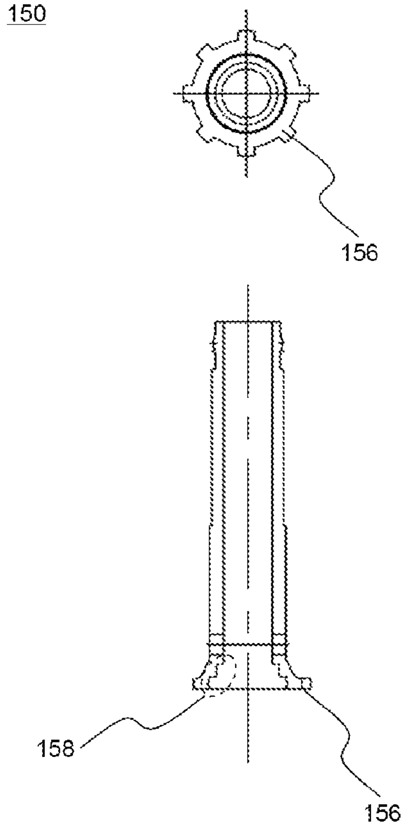
FIG. 2 is an enlarged plan view illustrating a stem of the pump shown in FIG. 1 including a vertical sectional view of the stem.

FIG. 2 is an enlarged plan view typically illustrating the stem of the pump shown in FIG. 1 including a vertical sectional view of the stem.

Referring to FIG. 2 together with FIG. 1, the stem 150 is configured to have a hollow structure open at the upper and lower parts thereof. At the lower part of the stem 150, the inner circumference of the stem 150 is configured to have a multi-step structure 158 corresponding to the shape of the sealing member 200 such that tight contact between the stem 150 and the sealing member 200 is easily achieved.

Also, an extension protrusion 156 is formed at the outer circumference of the stem 150 at the lower part of the stem 150. When the extension protrusion 156 is engaged with the internal multi-step structure of the housing 110, therefore, the downward movement of the stem 150 for pumping is ended.

Figure 3:
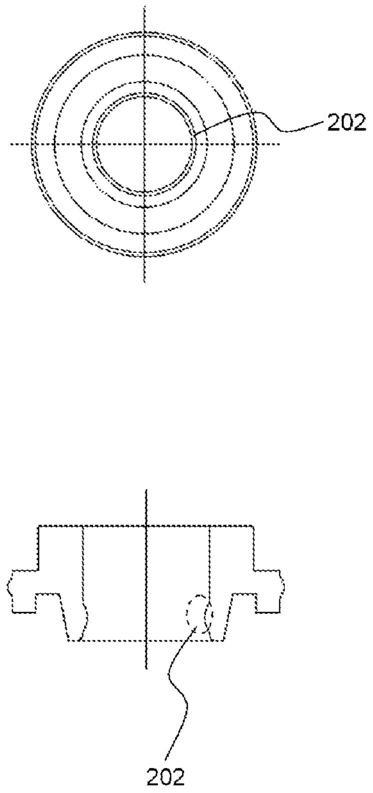
FIG. 3 is an enlarged plan view illustrating a sealing member of the pump shown in FIG. 1 including a vertical sectional view of the sealing member.

FIG. 3 is an enlarged plan view typically illustrating the sealing member of the pump shown in FIG. 1 including a vertical sectional view of the sealing member.

Referring to FIG. 3 together with FIG. 1, the sealing member 200 is embodied by a suction cover configured to have a hollow structure. The outer circumference of the suction cover is configured in a shape corresponding to the inner circumference of the stem 200 at the lower end of the stem 200. Also, an inner protrusion 202 is formed at the inner circumference of the suction cover at the lower end of the suction cover. The inner protrusion 202 improves tight contact between the outer circumference of the opening and closing member 190 at the upper end of the opening and closing member 190 and the inner circumference of the suction cover at the lower end of the suction cover.

Figure 4:
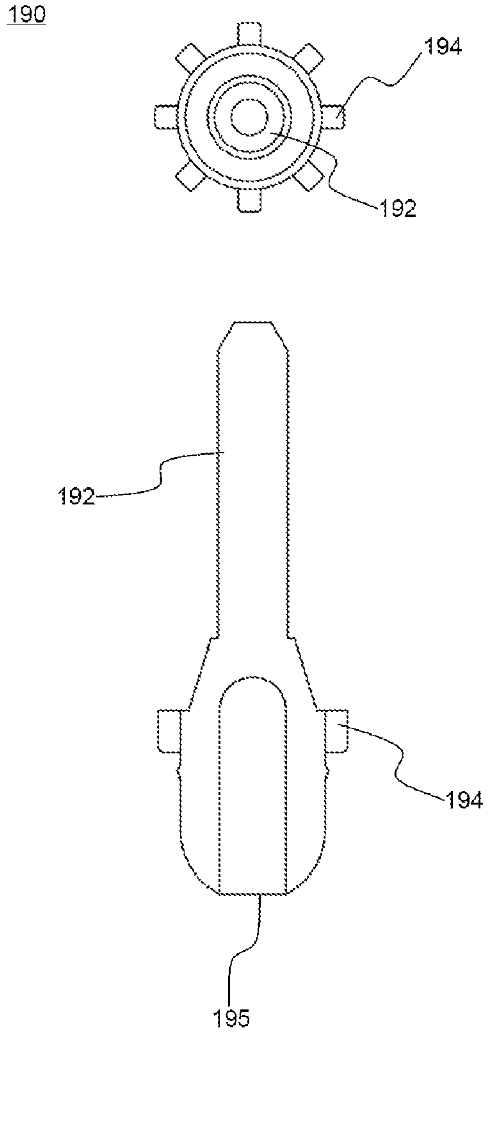
FIG. 4 is an enlarged plan view illustrating an opening and closing member of the pump shown in FIG. 1 including a vertical sectional view of the opening and closing member.

FIG. 4 is an enlarged plan view typically illustrating the opening and closing member of the pump shown in FIG. 1 including a vertical sectional view of the opening and closing member.

Referring to FIG. 4 together with FIG. 1, the opening and closing member 190 is configured to have a hollow structure open at the lower end 195 thereof. The opening and closing member includes an upper end vertical extension 192, which is configured to be inserted into the vertical channel 154 of the stem 150. At the side of the lower part of the opening and closing member located at the inlet port 112 formed at the lower end of the housing 110 are formed radial protrusions 194, which extend outward.

Also, the upper end vertical extension 192 is configured to move along the hollow inside of the sealing member 200 while the upper end vertical extension 192 is in tight contact with the hollow inside of the sealing member 200. The upward and downward movement of the radial protrusions 194 is restricted by a projection part 114 formed at the inside of the inlet port 112 formed at the lower end of the housing 110 for preventing separation of the opening and closing member 190 in the upward direction of the housing 110.

Figure 5:
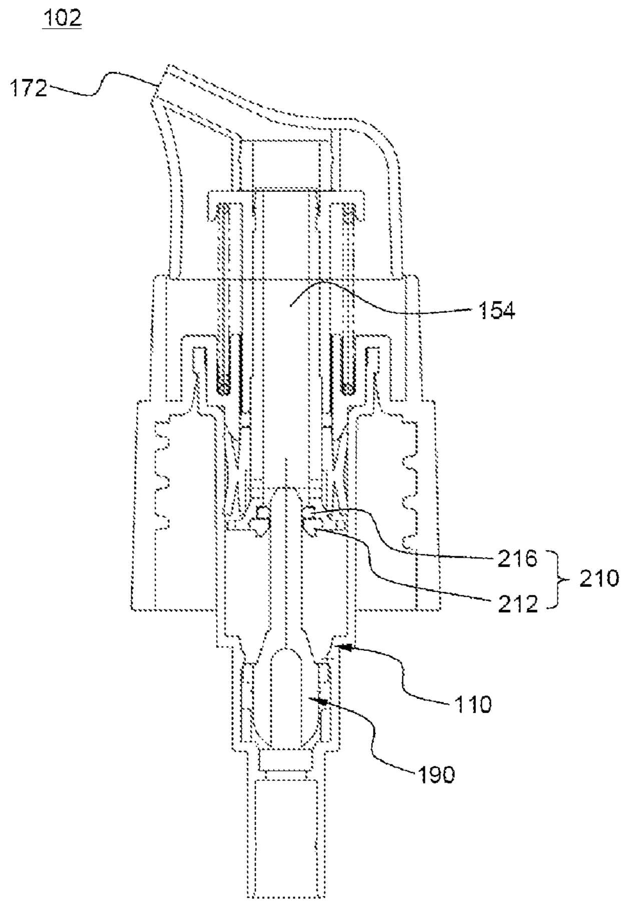
FIG. 5 is a vertical sectional view illustrating a hand-operated spray pump according to another embodiment of the present invention.

FIG. 5 is a vertical sectional view typically illustrating a hand-operated spray pump according to another embodiment of the present invention.

Referring to FIG. 5, a hand-operated spray pump 102 is configured to have a structure in which a sealing member 210 is modified to more effectively suction content, such as oil exhibiting low viscosity, remaining at the end of the nozzle 172 into the vertical channel 154 of the housing 110.

That is, the hand-operated spray pump 102 of FIG. 5 is identical in structure to the hand-operated spray pump 100 of FIG. 1 excluding the sealing member 210. Therefore, the sealing member 210 will hereinafter be described in detail, and a description will not be given of the other components of the hand-operated spray pump 102.

Figure 6:
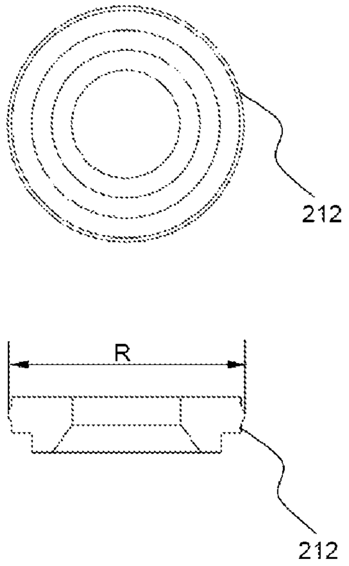
FIG. 6 is a plan view illustrating a suction cover constituting a sealing member of the pump shown in FIG. 5 including a vertical sectional view of the suction cover.
Figure 7:
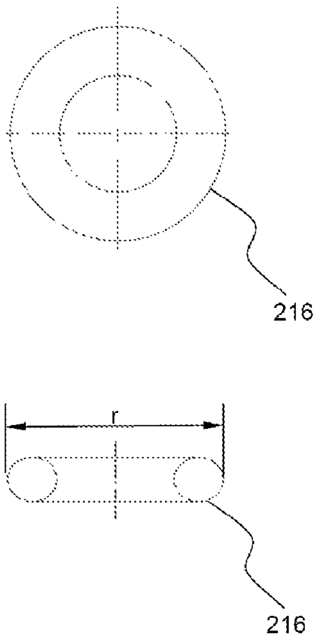
FIG. 7 is a plan view illustrating a suction ring constituting the sealing member of the pump shown in FIG. 5 including a vertical sectional view of the suction ring.

FIG. 6 is a plan view typically illustrating a suction cover constituting the sealing member of the pump shown in FIG. 5 including a vertical sectional view of the suction cover, and FIG. 7 is a plan view typically illustrating a suction ring constituting the sealing member of the pump shown in FIG. 5 including a vertical sectional view of the suction ring.

Referring to FIGS. 6 and 7 together with FIG. 5, the sealing member 210 includes a suction cover 212 configured to have a hollow structure and a suction ring 216 mounted at the top of the suction cover 212. The suction cover 212 has an outer diameter R greater than an outer diameter r of the suction ring 216. As a result, the hand-operated spray pump 102 of FIG. 5 is configured to have a double sealed type structure achieved by the suction cover 212 and the suction ring 216 as compared with the hand-operated spray pump 100 of FIG. 1, thereby further improving sealability with respect to the opening and closing member 190.

Figure 8:
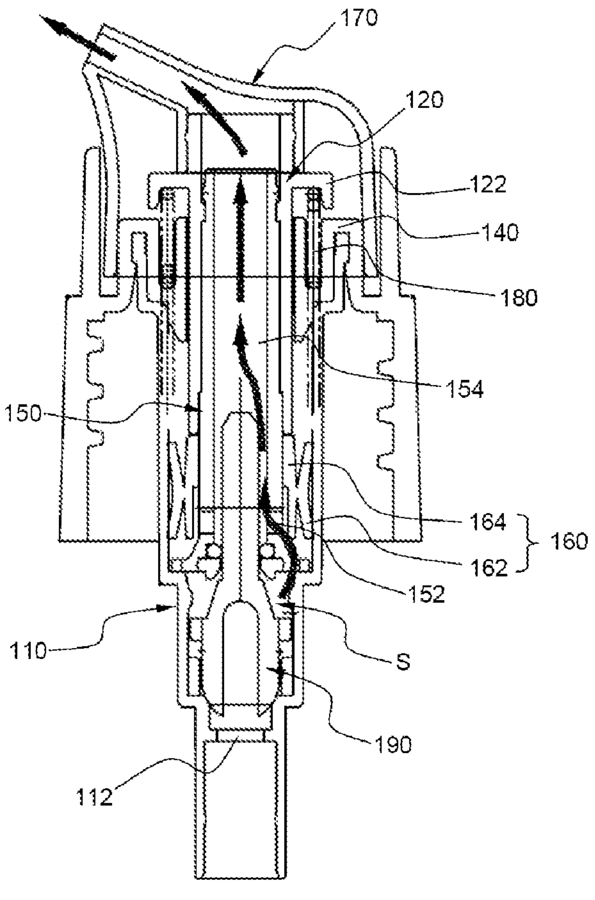
FIG. 8 is a vertical sectional view illustrating the pump of FIG. 5 in a pressurized mode.
Figure 9:
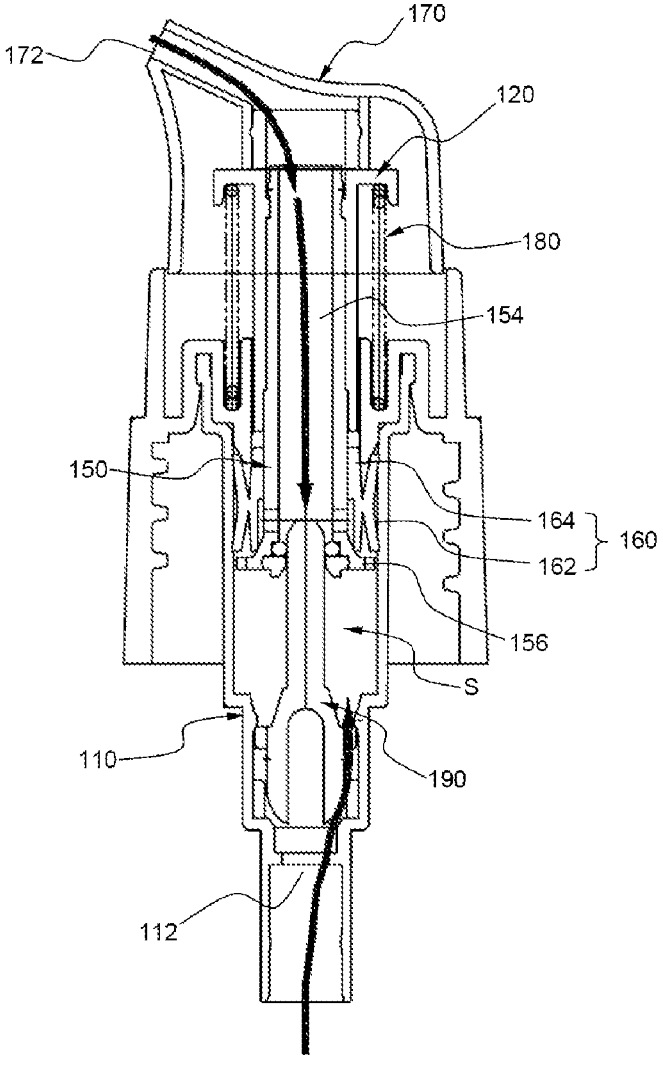
FIG. 9 is a vertical sectional view illustrating the pump of FIG. 5 in a relaxed mode.

FIG. 8 is a vertical sectional view typically illustrating the pump of FIG. 5 in a pressurized mode, and FIG. 9 is a vertical sectional view typically illustrating the pump of FIG. 5 in a relaxed mode.

Referring first to FIG. 8, in a pressurized mode, the stem 150 is simultaneously moved downward upon the downward movement of the shaft 120, with the result that the compression spring 180 located between the side protrusion 122 formed at the upper end of the shaft 120 at the side of the shaft 120 and the housing cap 140 is compressed.

When the button 170 is pushed, the shaft 120 and the stem 150 mounted at the inside of the shaft 120 are simultaneously moved downward, and therefore, the internal pressure of the housing 110 is increased. As a result, content in the housing 110 is introduced into the vertical channel 154 of the stem 150 via the horizontal channel 152 of the stem 150. Also, the content pushes the opening and closing member 190 downward, with the result that the inlet port 112 formed at the lower end of the housing 110 is closed.

Meanwhile, frictional force which the outer circumferential part 162 of the piston 160 has with respect to the inside of the housing 110 is greater than frictional force which the inner circumferential part 164 of the piston 160 has with respect to the outside of the stem 150, and therefore, the piston is not moved until the lower end of the shaft 120 reaches the upper end of the inner circumferential part 164 of the piston 160. As a result, the vertical channel 154 of the stem 150 communicates with the internal space S of the housing 110, and therefore, content pressurized in the internal space S of the housing 110 is introduced into the vertical channel 154 of the stem 150 and is then moved upward.

Referring to FIG. 9, in a relaxed mode, the shaft 120 and the stem 150 are simultaneously moved upward by restoring force of the compression spring 180, with the result that the piston 160 is not moved until the inner circumferential part 164 of the piston 160 comes into contact with the extension protrusion 156 formed at the lower end of the stem 150 due to the difference in frictional force between the outer circumferential part 162 and the inner circumferential part 164 of the piston 160 as described above.

Consequently, the stem 150 is moved upward while the vertical channel 154 of the stem 150 does not communicate with the internal space S of the housing 110, and therefore, pressure is lowered in the internal space S of the housing 110. As a result, the opening and closing member 190 is opened, and therefore, content is introduced into the internal space S of the housing 110. Consequently, the lowering of pressure is solved.

In the relaxed mode, pressure is also lowered in the vertical channel 154 of the stem 150, and therefore, residual content in the inlet of the nozzle 172 is suctioned into the vertical channel 154 of the stem 150. As a result, it is possible to effectively prevent the residual content from falling from the inlet of the nozzle 172 or being solidified.

Figure 10:
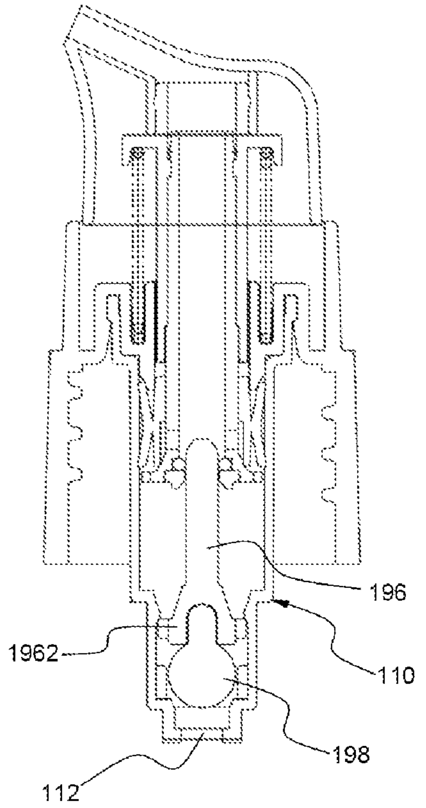
FIG. 10 is a vertical sectional view illustrating a pump configured to have a structure in which a suction ball is coupled to the lower end of an opening and closing member of the pump.

FIG. 10 is a vertical sectional view typically illustrating a pump configured to have a structure in which a suction ball is coupled to the lower end of an opening and closing member of the pump.

Referring to FIG. 10, an opening and closing member 196 is provided at the lower end thereof with a depression 1962. The depression 1962 is coupled to a suction ball 198 to improve sealability with respect to the inlet port 112 formed at the lower end of the housing 110.

During pumping, the suction ball 198 is moved upward and downward along with the opening and closing member 196 to open and close the inlet port 112 formed at the lower end of the housing 110. The inlet port 112 formed at the lower end of the housing 110 is effectively sealed by gravity and the spherical structure of the suction ball 198.

INDUSTRIAL APPLICABILITY

As is apparent from the above description, the hand-operated spray pump according to the present invention is configured such that residual content in the nozzle is suctioned into the vertical channel of the stem after pumping by the sealing member mounted at the lower end of the stem and the opening and closing member moving upward into and downward from the vertical channel through the lower end of the stem. Consequently, it is possible to effectively prevent the discharge port of the hand-operated spray pump from being clogged due to the residual content in the end of the nozzle of the button. In addition, it is possible to effectively prevent the hand-operated spray pump from being contaminated due to the residual content in the end of the nozzle of the button.

Also, the compression spring is not located on the route along which the content flows, and therefore, it is possible to prevent the content from being contaminated due to flow resistance of the content and the compressing spring.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A hand-operated spray pump configured to discharge a predetermined amount of content upon pressing a button and to suction a residual portion of the content in an end of a nozzle after discharging the content, the hand-operated spray pump comprising:

(a) a housing forming an external appearance of the pump;

(b) a housing cap configured to guide upward and downward movement of a shaft, to connect the housing to a closure, and to seal an internal space of the housing from an outside;

(c) the closure coupled to an upper part of the housing at an outside of the housing via the housing cap for mounting a container containing content in the housing, the closure being integrally formed with the housing cap;

(d) a stem having a horizontal channel communicating with the internal space of the housing and a vertical channel communicating with the horizontal channel, the stem being configured to move upward and downward while being connected to a lower end of the button;

(e) the shaft configured to move upward and downward along an inside of the housing cap while being coupled to the outside of the stem;

(f) a piston configured to move upward and downward along an inner wall of the housing for opening and closing the horizontal channel of the stem while being mounted to a lower part of the stem;

(g) a compression spring provided between a side protrusion formed at an upper end of the shaft at a side of the shaft and the housing cap for providing restoring force to the shaft during pumping;

(h) an opening and closing member located at a lower part of the housing in the internal space of the housing for opening and closing an inlet port formed at a lower end of the housing during pumping, the opening and closing member being configured to move upward into and downward from the vertical channel through a lower end of the stem such that the residual content in the nozzle is suctioned after pumping; and (i) a sealing member mounted at the lower end of the stem in a state in which the sealing member is in tight contact with an outside of the opening and closing member inserted into the vertical channel for increasing force necessary to suction and seal the residual content, wherein the sealing member comprises a suction cover configured to have a hollow structure, the suction cover has an outer circumference configured in a shape corresponding to an inner circumference of the stem at the lower end of the stem, and an inner protrusion is formed at an inner circumference of the suction cover at a lower end of the suction cover for improving tight contact between an outer circumference of the opening and closing member at an upper end of the opening and closing member and the inner circumference of the suction cover at the lower end of the suction cover.

2. The hand-operated spray pump according to claim 1, wherein the opening and closing member comprises an upper end vertical extension configured to be inserted into the vertical channel of the stem, the opening and closing member is provided at a side of a lower part thereof located at the inlet port formed at the lower end of the housing with radial protrusions extending outward, and the upper end vertical extension is configured to move along a hollow inside of the sealing member while the upper end vertical extension is in tight contact with the hollow inside of the sealing member.

3. The hand-operated spray pump according to claim 2, wherein the opening and closing member is configured to have a hollow structure open at a lower end thereof, and a projection part is formed at the inside of the inlet port formed at the lower end of the housing for restricting upward movement of the opening and closing member.

4. The hand-operated spray pump according to claim 2, wherein the opening and closing member is provided at a lower end thereof with a depression, and the depression is coupled to a suction ball to improve sealability with respect to the inlet port formed at the lower end of the housing.

5. The hand-operated spray pump according to claim 1, wherein the suction cover is made of linear low-density polyethylene (LLDPE).

* * * * *

6. The hand-operated spray pump according to claim 1, wherein the opening and closing member is made of linear low-density polyethylene (LLDPE), and the stem is made of polyoxymethylene (POM).

* * * * *